US009088048B2

(12) United States Patent
Ma et al.

(10) Patent No.: US 9,088,048 B2
(45) Date of Patent: Jul. 21, 2015

(54) SILICON WHISKER AND CARBON NANOFIBER COMPOSITE ANODE

(75) Inventors: Junqing Ma, Andover, MA (US); Aron Newman, Cambridge, MA (US); John Lennhoff, Andover, MA (US)

(73) Assignee: Physical Sciences, Inc., Andover, MA (US)

( * ) Notice: Subject to any disclaimer, the term of this patent is extended or adjusted under 35 U.S.C. 154(b) by 943 days.

(21) Appl. No.: 12/948,697

(22) Filed: Nov. 17, 2010

(65) Prior Publication Data
US 2011/0117436 A1 May 19, 2011

Related U.S. Application Data

(60) Provisional application No. 61/262,011, filed on Nov. 17, 2009, provisional application No. 61/301,932, filed on Feb. 5, 2010.

(51) Int. Cl.
*H01M 4/583* (2010.01)
*B82Y 30/00* (2011.01)

(52) U.S. Cl.
CPC .............. *H01M 4/583* (2013.01); *B82Y 30/00* (2013.01)

(58) Field of Classification Search
CPC .................................. H01M 4/583; B82Y 30/00
USPC ................. 429/231.8; 427/113; 977/742, 762
See application file for complete search history.

(56) References Cited

U.S. PATENT DOCUMENTS

| 2009/0186276 | A1 | 7/2009 | Zhamu et al. | |
| 2009/0305135 | A1* | 12/2009 | Shi et al. | 429/217 |
| 2010/0297502 | A1 | 11/2010 | Zhu et al. | |
| 2012/0034524 | A1* | 2/2012 | Caracciolo et al. | 429/219 |
| 2013/0004847 | A1* | 1/2013 | Kumar et al. | 429/220 |

OTHER PUBLICATIONS

Boukamp, B.A., et al., "All-Solid Lithium Electrodes with Mixed-Conductor Matrix," J. Electrochemical Society, vol. 128, No. 4, 725-729 (1981).
Chan, C.K., et al., "High-performance lithium battery anodes using silicon nanowires," Nature Nanotechnology, vol. 3, 31-35 (Jan. 2008).
Chen, L., et al., "Enhancing Electrochemical Performance of Silicon Film Anode by Vinylene Carbonate Electrolyte Additive," Electrochemical and Solid-State Letters, 9(11), A512-A515, (2006).
Eom, J.Y., et al., "Electrochemical Insertion of Lithium into Multiwalled Carbon Nanotube/Silicon Composites Produced by Ballmilling," Journal of Electrochemical Society, 153 (9), A1678-A1684 (2006).
Graetz, J., et al., "Highly Reversible Lithium Storage in Nano structured Silicon," Electrochemical and Solid-State Letters, 6(9), A194-A197 (2003).
Herstedt, M., et al., "Characterization of the SEI formed on natural graphite in PC-based electrolytes," Electrochimica Acta, vol. 49, Issue 27, 4939-4947, (2004).

(Continued)

*Primary Examiner* — Cynthia H Kelly
*Assistant Examiner* — Monique Wills
(74) *Attorney, Agent, or Firm* — Proskauer Rose LLP

(57) ABSTRACT

A carbon nanofiber can have a surface and include at least one crystalline whisker extending from the surface of the carbon nanofiber. A battery anode composition can be formed from a plurality of carbon nanofibers each including a plurality of crystalline whiskers.

7 Claims, 15 Drawing Sheets

(56) References Cited

OTHER PUBLICATIONS

Kasavajjula, U., et al., "Nano- and bulk-silicon-based insertion anodes for lithium-ion secondary cells," Journal of Power Sources, 163, 1003-1039 (2007).

Manzo, M.A., et al., "Glenn Research Center Battery and Fuel Cell Development for NASA's Exploration Missions," 11th Electrochemical Power Sources R&D symposium, Baltimore, MD, Jul. 13-16, 31 pages, (2009).

Obrovac, M.N. et al., "Structural Changes in Silicon Anodes During Lithium Insertion/Extraction," Electrochemical and Solid-State Letters, 7(5), A93-A96, (2004).

Poizot, P., et al., "Nano-sized transition-metal oxides as negative-electrode materials for lithium-ion batteries," Nature, vol. 407, 496-499, (2000).

Reid, C.M., "A Study on Advanced Lithium-Based Battery Cell Chemistries to Enhance Lunar Exploration Missions," 11th Electrochemical Power Sources R&D symposium, Baltimore, MD, Jul. 13-16, 22 pages, (2009).

Shodai, T., et al., "Study of $Li_{3-x}M_xN$ (M: Co, Ni or Cu) system for use as anode material in lithium rechargeable cells," Solid State Ionics, 86-88, 785-789 (1996).

Smart, M.C., et al., "Low Temperature Lithium-Ion Electrolyte Development at JPL for Aerospace Applications," Advanced Technology Development Program Review Meeting Department of Energy (DOE), Lawrence Berkeley National Lab, Berkeley, CA, 32 pages, Feb. 16, 2005.

Xu, K., "Nonaqueous Liquid Electrolytes for Lithium-Based Rechargeable Batteries," Chemistry Reviews, 104, 4303-4417 (2004).

http://www.mpoweruk.com/chemistries.htm, 7 pages (2005).

Korpinarov, N., et al., "Silicon nanowires and whiskers obtained by arc discharge," Journal of Physics: Conference Series 113 (2008), 6 pages.

Lao, J.Y., et al., "Hierarchical ZnO Nanostructures," American Chemical Society 2002, Aug. 30, 2002, 5 pages.

Zeng, B., et al., "Field emission of silicon nanowires," Applied Physics Letters 88, (2006), 3 pages.

Zeng, B., et al., "Field emission of silicon nanowires grown on carbon cloth," Applied Physics Letter 90, (2007), 3 pages.

Park, K., et al., "Interfaces in Silicon Carbide Whisker and Carbon Fiber Reinforced Calcium Phosphate Composites," Materials Research Society Symp. Proc., vol. 319, 1994, pp. 51-56.

Shen, L., et al., "Nanosize Silicon Whiskers Produced by Chemical Vapor Deposition: Active Gettes for $NF_3$," Chem. Mater, 1995, 7, pp. 961-968.

* cited by examiner

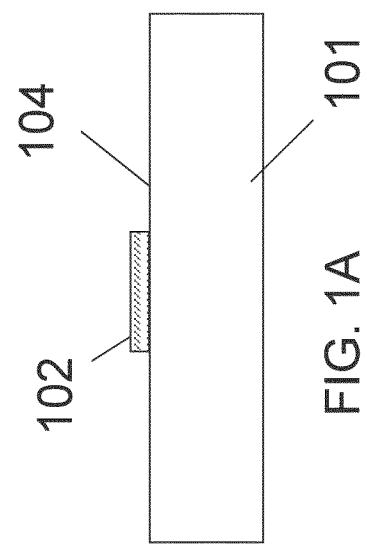
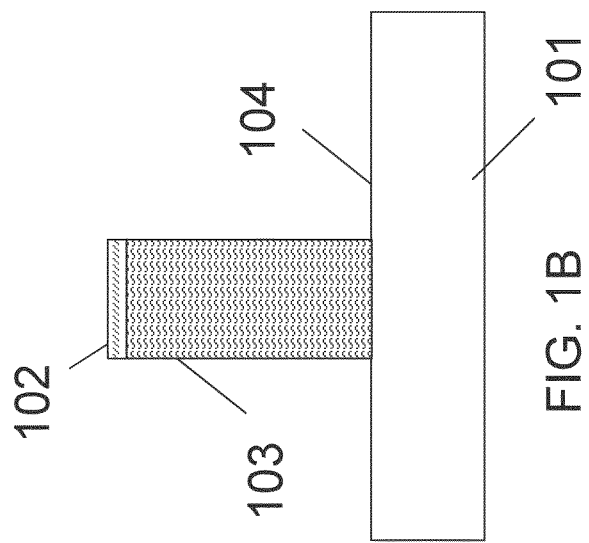
FIG. 1B
FIG. 1A

SILICON WHISKER AND CARBON NANOFIBER COMPOSITE ANODE

RELATED APPLICATIONS

This application claims the benefit of and priority to U.S. Provisional Application No. 61/262,011 and filed Nov. 17, 2009, which is owned by the assignee of the instant application and the disclosure of which incorporated herein by reference in its entirety. This application claims the benefit of and priority to U.S. Provisional Application No. 61/301,932 and filed Feb. 5, 2010, which is owned by the assignee of the instant application and the disclosure of which incorporated herein by reference in its entirety.

STATEMENT OF GOVERNMENT INTEREST

The subject matter described herein was developed in connection with funding provided by the National Aeronautics and Space Administration ("NASA") under Contract Nos. NNX10CA51C and NNX09CD30P. The Federal government may have rights in the technology.

FIELD OF THE INVENTION

This invention relates generally to an anode material, and more particularly, to a silicon whisker and carbon nanofiber composite anode.

BACKGROUND OF THE INVENTION

Lithium-ion batteries are rechargeable batteries that have a wide variety of uses. In general, lithium ions move from a negative electrode to a positive electrode during discharge, or during use of the battery, and from the positive electrode to the negative electrode when the battery is being charged. Lithium-ion batteries are common in electronics, space applications, electric vehicles, and military applications due to their high energy-to-weight ratio and slow loss of charge when the battery is not being used. Lithium-ion batteries are significantly lighter than equivalents in other chemistries such as, for example, lead-acid, nickel-metal hydride, and nickel cadmium.

Silicon is an attractive anode material for lithium-ion batteries because of its low discharge potential relative to alternative anode materials. In addition, silicon has the highest known theoretical charge capacity of 4,200 mAh/g. Despite its capacity advantage over existing graphite anodes (327 mAh/g) and various nitride and oxide materials, silicon anodes have limited applications because silicon's volume changes by about 300% upon insertion and extraction of lithium. This volume change results in pulverization of the silicon anode as well as capacity fading. Current approaches addressing the cycling issues of silicon anodes include pure silicon micro- and nano-scale powder anodes, silicon dispersed in an inactive matrix, silicon dispersed in an active matrix, silicon anodes with different binders, and silicon thin films.

Using a pure form of silicon such as silicon bulk films and micrometer sized particles as anodes in lithium batteries shows capacity fading and short cycle life due to pulverization and loss of electrical contact between the active material and the current collector. An efficient approach showing promising results is to stabilize silicon by forming alloys. One of the major limitations and issues, however, is the low concentration of silicon in the alloys. The inactive alloying metals that are added to the system can make overall system capacity suffer. Less stabilizing metals result in an increase in silicon random crystalline domains, which can crack upon lithiation and de-lithiation.

To achieve a 1:1 or higher silicon ratio in the composite, thick polycrystalline or amorphous silicon domains can be formed by conventional processes, including chemical vapor deposition ("CVD"). These domains are known for their poor cycle life due to the lack of an electrical conduction path.

SUMMARY OF THE INVENTION

The invention, in one embodiment, features an anode material for use within a lithium-ion battery. The anode material can have high specific capacity, improved cycle life, low first cycle irreversible loss, and/or improved rate capability as compared to current lithium-ion batteries and/or anode materials. The anode material can replace current graphite or other anode materials with little to no change to the rest of the battery.

Nanowires or whiskers, which are single crystals in nature, possess structural advantages that can efficiently tolerate/mitigate volume change over conventional coatings or nanoparticles. During electrochemical cycling, the stress imposed by volume changes can be less destructive for single crystalline whiskers than for polycrystalline particles. As a result of the random, all-direction stresses, polycrystalline particles fracture into electronically isolated pieces causing a capacity fade. For example, a silicon nanowire that is smaller than a critical flaw size of single crystalline silicon, for example, about 20 nm, can make the silicon nanowire crack-resistant.

An anode that is capable of high capacity and good cycle life and rate capability can include a composite material that is high in free volume. The active material can be free from polycrystalline domains to prevent fracturing. When silicon is used as an anode material, it is not possible to achieve these parameters by using conventional CVD processes. In addition, the active silicon material can account for about 50% or higher of the total composite weight. The material that supports the silicon can provide an electronically conductive framework for the silicon active material. The silicon anode material can also be capable of being formed and/or processed using established procedures and equipment to minimize the cost associated with making the silicon anode material.

In one aspect, the invention features a composition of matter including a carbon nanofiber having a surface. The composition also includes at least one crystalline whisker extending from the surface of the carbon nanofiber.

In another aspect, the invention features a battery anode composition including an electrically conductive carbonaceous substrate having a surface. The battery anode composition also includes at least one crystalline whisker extending from the surface of the electrically conductive carbonaceous substrate.

In a further aspect, the invention features a battery including a cathode and an anode. The cathode is formed of a metal oxide or lithium metal. The anode includes an electrically conductive carbonaceous substrate having a surface and at least one crystalline whisker extending from the surface of the electrically conductive carbonaceous substrate. The battery also includes a separator and a non-aqueous electrolyte disposed between the cathode and the anode.

In yet another aspect, the invention features a method of manufacturing a battery. The method providing a cathode current collector that defines a surface, and depositing a cathode material onto the surface of the cathode current collector. An anode current collector includes an electrically conductive carbonaceous substrate having a surface. An anode composition can be formed on the surface of electrically conductive carbonaceous substrate. The anode composition includes at least one crystalline whisker extending from the surface of the electrically conductive carbonaceous substrate.

In some embodiments, the at least one crystalline whisker is a mono-crystalline nanorod. Crystalline whiskers can be formed from silicon. A crystalline whisker can have a diameter of less than about 100 nanometers. In some embodiments, the crystalline whiskers have a diameter of about 20 nanometers.

The carbon nanofiber can be a tubular filament. In some embodiments, the carbon nanofiber has an electrical resistivity less than about 0.2 Ω-cm. The carbon nanofiber can have a diameter of less than about 500 nanometers. In some embodiments, the carbon nanofiber has a diameter of about 70 nanometers. In some embodiments, the carbon nanofiber comprises at least one of an amorphous material or a crystalline material. The carbon nanofiber can be a graphite nanofiber.

The crystalline whisker(s) and the carbon nanofiber(s) can have a weight ratio of greater than about 1:10. In some embodiment, the crystalline whisker(s) is formed from silicon, germanium, or tin.

In some embodiments, the electrically conductive carbonaceous substrate includes an unordered arrangement of carbon nanofibers. Each of the carbon nanofibers can have a surface and can form an electrically conductive network. In some embodiments, the at least one crystalline whisker extends from the surface of each of the carbon nanofibers.

The electrically conductive carbonaceous substrate can have a diameter of less than about 500 nanometers. In some embodiments, the electrically conductive carbonaceous substrate has a diameter of about 70 nanometers. The crystalline whisker(s) and the electrically conductive carbonaceous substrate can have a weight ratio of greater than about 1:10.

Catalyst seeds can be deposited on the electrically conductive carbonaceous substrate. A crystalline whisker can be formed at a location on the surface of the electrically conductive carbonaceous substrate where one of the plurality of catalyst seeds is deposited. A gold-catalyzed vapor-liquid-solid ("VLS") process can be used to form an anode composition on an electrically conductive carbonaceous substrate.

The catalyst seeds can include gold, aluminum, or a silicon eutectic forming material. The catalyst seeds can have a diameter of less than about 100 nanometers. In some embodiments, the catalyst seeds have a diameter of about 20 nanometers.

Other aspects and advantages of the invention will become apparent from the following drawings and description, all of which illustrate principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1A is a schematic illustration of a catalyst seed on a carbonaceous substrate, according to an illustrative embodiment of the invention.

FIG. 1B is a schematic illustration of a crystalline whisker on a carbonaceous substrate, according to an illustrative embodiment of the invention.

DESCRIPTION OF THE INVENTION

FIG. 1A shows an electrically conductive carbonaceous substrate 101 with a catalyst seed 102 loaded on the surface 104 of the carbonaceous substrate 101. FIG. 1B shows a crystalline whisker 103 on a carbonaceous substrate 101. During formation of the composition, the crystalline whisker 103 grows under the catalyst seed 102, pushing the catalyst seed 102 away from the carbonaceous substrate 101. The catalyst seed 102 can remain at the end of the crystalline whisker 103 after the crystalline whisker 103 is grown on the carbonaceous substrate 101.

In some embodiments, the electrically conductive carbonaceous substrate 101 can be formed from carbon black, graphite, carbon nanomaterial, carbon nanotube(s), carbon nanofiber(s) carbon paper, or carbon cloth. The electrically conductive carbonaceous substrate 101 can be hollow. In some embodiments, the electrically conductive carbonaceous substrate 101 is a carbon particle, e.g., having a generally round shape. The electrically conductive carbonaceous substrate 101 can take on a variety of shapes, including, for example, a generally cylindrical shape, a generally spherical shape, or any other shape having a large electrically conductive surface area. In some embodiments, the electrically conductive carbonaceous substrate 101 does not comprise carbon and instead comprises another electrically conductive substance, for example, a metal.

Figure 2:
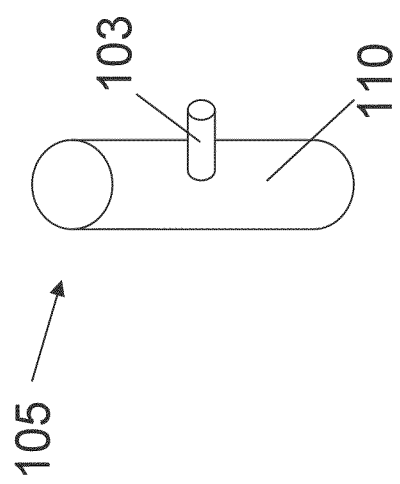
FIG. 2 is a schematic illustration of a composition of matter, according to an illustrative embodiment of the invention.
Figure 3:
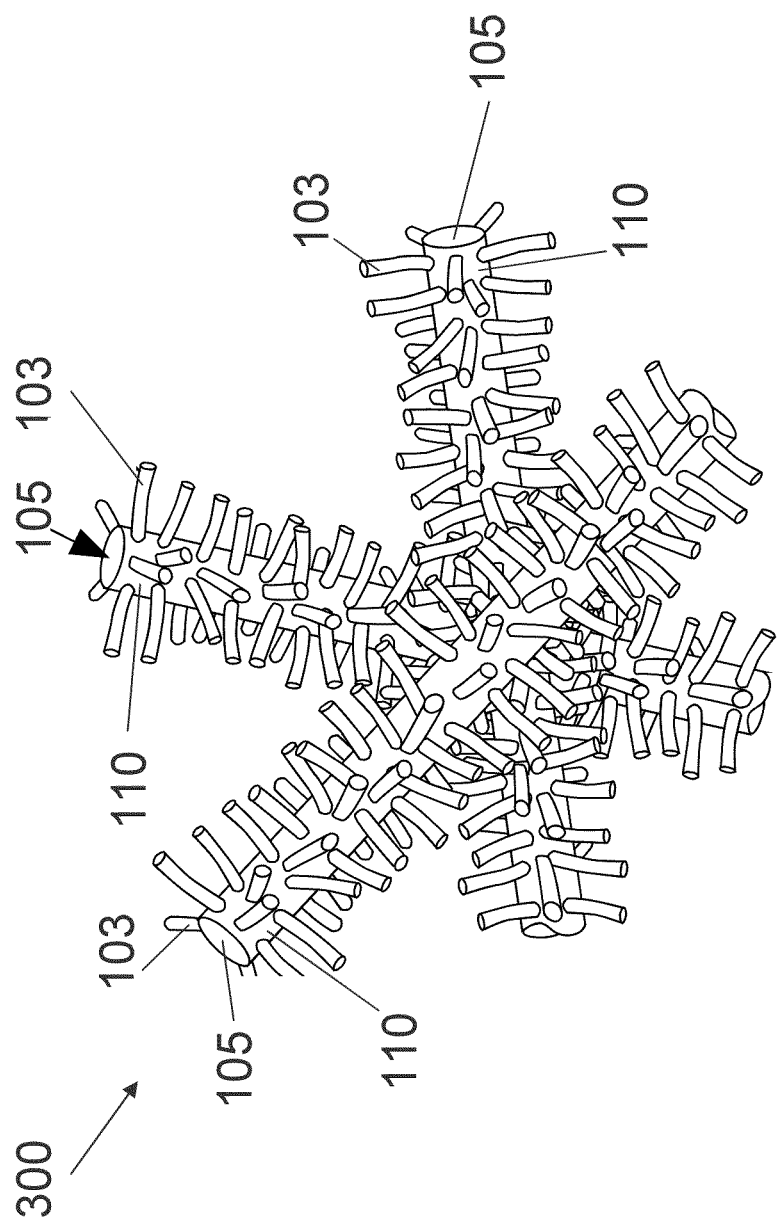
FIG. 3 is a schematic illustration of an electrically conductive network, according to an illustrative embodiment of the invention.

FIG. 2 shows a carbon nanofiber 105 having a surface 110. At least one crystalline whisker 103 extends from the surface 110 of the carbon nanofiber 105. FIG. 3 shows an electrically conductive network 300. In some embodiments, the electrically conductive network 300 of FIG. 3, or the compositions of FIG. 1B or 2, can be a battery anode composition or can be used in a battery anode composition. The electrically conductive network 300 can include a plurality of carbon nanofibers 105 as the electrically conductive carbonaceous substrate. The plurality of carbon nanofibers 105 can be in an unordered or ordered arrangement. Each carbon nanofiber 105 has a surface 110. At least one crystalline whisker 103 extends from the surface 110 of the electrically conductive carbonaceous substrate 105. The electrically conductive network 300 combines the advantages of single crystalline whiskers 103 and the high surface area and highly conductive nanofibers 105.

The number of carbon nanofibers 105 that make up the electrically conductive network 300 can vary. For example, the number of carbon nanofibers 105 can range from about 3 to about 1,000,000. In some embodiments, the carbon nanofibers 105 are hollow. The carbon nanofibers 105 can be Pyrograf III carbon nanofibers (e.g., supplied in the Pyrograf Products® line sold by Applied Sciences, Inc.). In some embodiments, the carbon nanofibers 105 can be manufactured by the same company that grows the crystalline whiskers.

In some embodiments, the carbon nanofiber 105 is a tubular filament. The carbon nanofiber 105 can have an electrical resistivity (e.g., how strongly a material opposes the flow of an electric current) less than about 0.2 $\Omega$-cm. This relatively low electrical resistivity of the carbon nanofiber 105 allows movement of electrical charge between the crystalline whisker 115 and the carbon nanofiber 105.

In some embodiments, the carbon nanofiber 105 can be formed from an amorphous material or a crystalline material. The carbon nanofiber 105 can be a graphite nanofiber. The carbon nanofiber 105 can have a diameter of less than about 500 nm. In some embodiments, the diameter of the carbon nanofiber 105 is less than about 250 nm. The diameter of the carbon nanofiber 105 can be about 70 nm. In some embodiments, the carbon nanofiber 105 is hollow.

In some embodiments, the at least one crystalline whisker 103 and the carbonaceous substrate 101 have a weight ratio greater than about 1:10. Multiple crystalline whiskers can extend from the surface of the carbonaceous substrate. The weight ratio of the composition can vary based on the composition of the crystalline whiskers and carbonaceous substrate. For example, when the crystalline whiskers are formed from silicon and the carbonaceous substrate is a carbon nanofiber, the weight ratio of the silicon crystalline whiskers to the carbon nanofiber is about 1:1. This 1:1 weight ratio is not achievable by depositing polycrystalline or amorphous silicon on the surface of a fibrous substrate.

To achieve a 1:1 weight ratio between the plurality crystalline whiskers 103 and the electrically conductive carbonaceous substrate 101, the unit length of the crystalline whiskers 103 can be controlled. For example, when the crystalline whisker is formed from silicon and the diameter of the silicon whisker is about 20 nm, the unit length of the silicon whisker is about 200 nm to achieve a 1:1 weight ratio. In this scenario, the silicon whiskers 103 can occupy only about 7% of the total surface area of the electrically conductive carbonaceous substrate 101.

In some embodiments, the at least one crystalline whisker 103 is a crystalline nanorod. The crystalline whisker 103 can be formed from silicon, germanium or tin. The crystalline whisker 103 can have a diameter of less than about 100 nanometers. In some embodiments, the crystalline whisker 103 has a diameter of less than about 50 nanometers. The crystalline whisker 103 can have a diameter of about 20 nanometers. The length and diameter of the crystalline whiskers 103 throughout the network or composite can be randomly distributed and not homogeneous.

The crystalline whisker 103 can have a diameter such that volume changes that can occur upon insertion and extraction of lithium within a lithium-ion battery do not pulverize the crystalline whisker 103. In some embodiments, the crystalline whisker 103 can have a single crystalline domain, for example, the crystalline whisker 103 can be free from a polycrystalline domain. The single crystalline nature of the whisker can affect the diameter of the whisker. If the crystalline whisker 103 is silicon, for example, the diameter of the crystalline whisker 103 can be about 20 nm. The diameter of the crystalline whisker 103 can vary depending on the specific composition of the crystalline whisker 103. In general, when the composition is being used as an anode material within a lithium-ion battery, the diameter of the crystalline whisker 103 can be at or below the terminal particle size (e.g., the size below which the particles of the composition will not fracture) of the crystalline whisker 103. The terminal particle of the crystalline whisker 103 can vary based on the composition of the crystalline whisker 103. For example, the terminal particle size can be about 5 nm to about 500 nm.

The crystalline whiskers 103 can be arranged in an unordered or an ordered state. In some embodiments, the crystalline whiskers 103 are configured to form an electrically conductive attachment to its respective electrically conductive carbonaceous substrate 101.

The crystalline whiskers 103 can extend radially from the surface 110 of the electrically conductive carbonaceous substrate 101 or can grow at a 90° angle to the electrically conductive carbonaceous substrate 101. In some embodiments, the whiskers 103 can extend from the surface 110 of the electrically conductive carbonaceous substrate 101 at an angle that is less than 90°, for example at about 45° or about 55°.

Figures 4A, 4B:
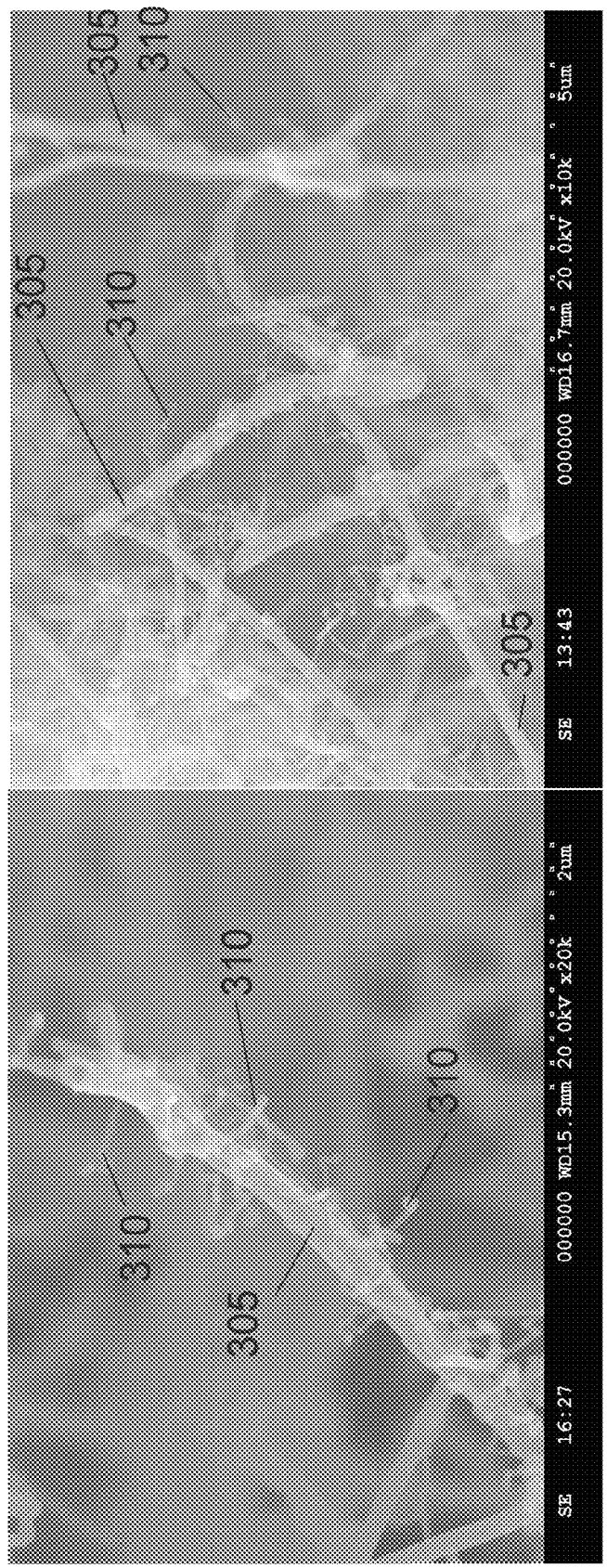
FIG. 4A is a scanning electron microscope ("SEM") image of a carbonaceous substrate and crystalline whiskers, according to an illustrative embodiment of the invention.
FIG. 4B is an SEM image of carbonaceous substrate and crystalline whiskers, according to an illustrative embodiment of the invention.

FIG. 4A and FIG. 4B show SEM images of a carbonaceous substrate and crystalline whiskers. FIG. 4A shows a carbon nanofiber 305 with a plurality of silicon crystalline whiskers 310 extending from the surface of the carbon nanofiber 305. FIG. 4B shows an electrically conductive network, including a plurality of nanofibers 305 and a plurality of crystalline whiskers 310 extending from each of the surfaces of the nanofibers 305. The diameters of the nanofibers 305 are about 70 nm to about 200 nm and the diameters of the silicon whiskers 310 are about 20 nm to about 100 nm.

Figure 5:
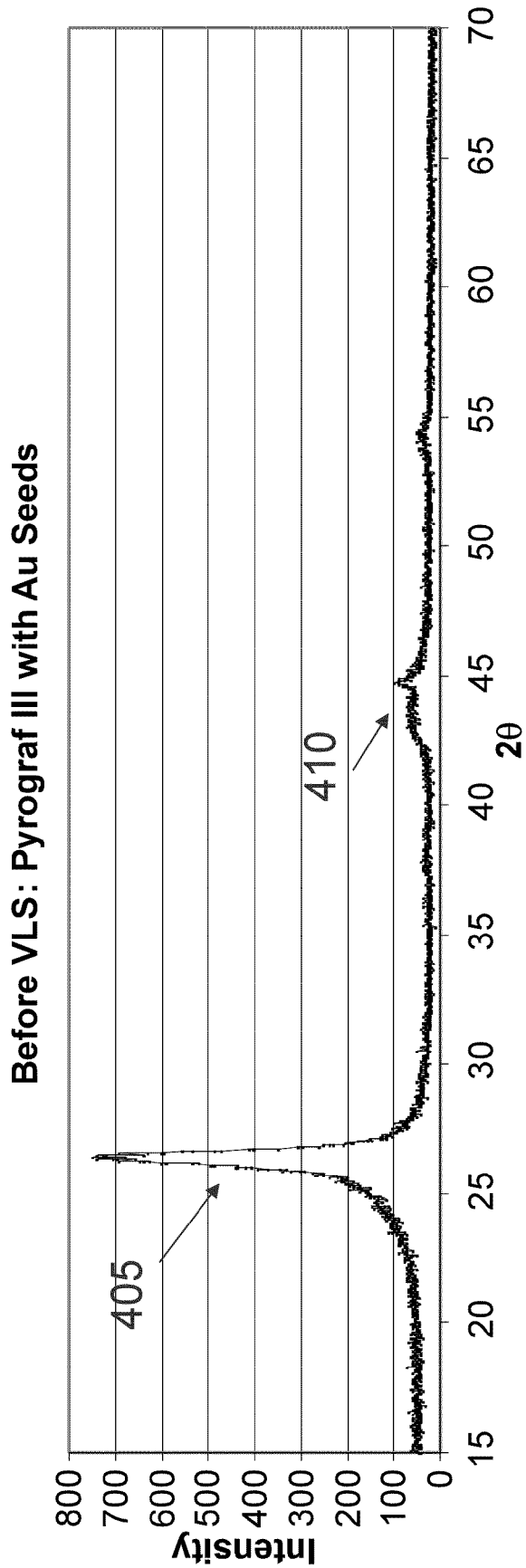
FIG. 5 is an x-ray diffraction ("XRD") plot of intensity versus 2-theta angle for a carbon nanofiber with gold seeds prior to the formation of crystalline whiskers, according to an illustrative embodiment of the invention.
Figure 6:
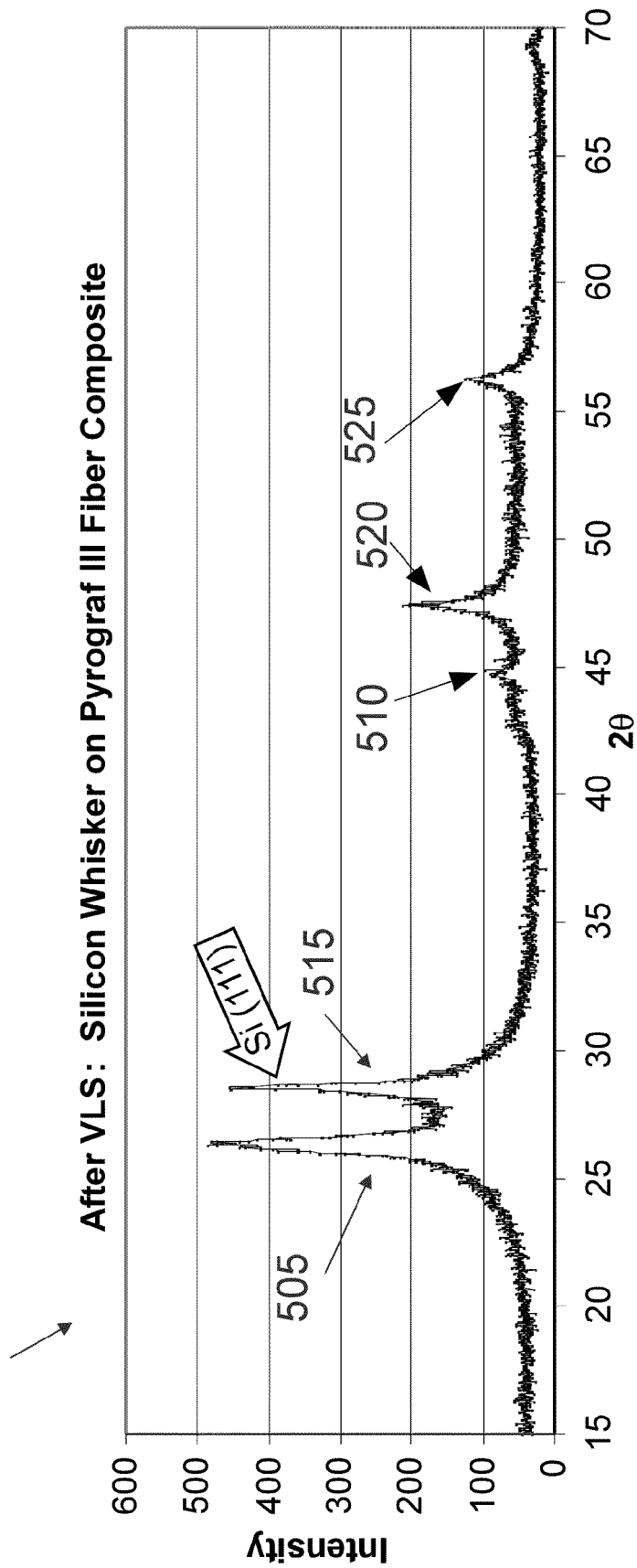
FIG. 6 is an XRD plot of intensity versus 2-theta angle for a carbon nanofiber with crystalline whiskers according to an illustrative embodiment of the invention.

XRD plots were obtained for the Pyrograf III carbon nanofibers with silicon whiskers. FIG. 5 shows an XRD plot of intensity versus 2-theta angle for a carbon nanofiber with gold seeds prior to the formation of crystalline whiskers. FIG. 6 shows an XRD plot of intensity versus 2-theta angle for a carbon nanofiber with crystalline whiskers. The gold seeds are catalysts that are used in the formation of the crystalline whiskers. Referring to FIG. 5, the XRD plot shows a peak 405 at about 27° 2θ. The peak 405 represents the presence of the carbonaceous substrate. A small peak 410 at about 45° 2θ represents the presence of the gold catalyst within the composition.

FIG. 6 shows the presence of silicon whiskers within the composition. The peak 505 at about 27° 2θ represents the presence of carbon nanofibers, and the peak 510 at about 45° 2θ represents the presence of the gold catalyst within the composition. Three additional peaks 515, 520, 525 are present at about 29° 2θ, 47° 2θ, and 57° 2θ respectively. These peaks 515, 520, 525 represent a silicon whisker. More specifically, these peaks 515, 520, 525 represent a single crystalline silicon whisker, about 500 nm in length. Moreover, the peaks 515, 520, 525 represent silicon 111 ("Si 111"), which is silicon at a low energy.

Figure 7A:
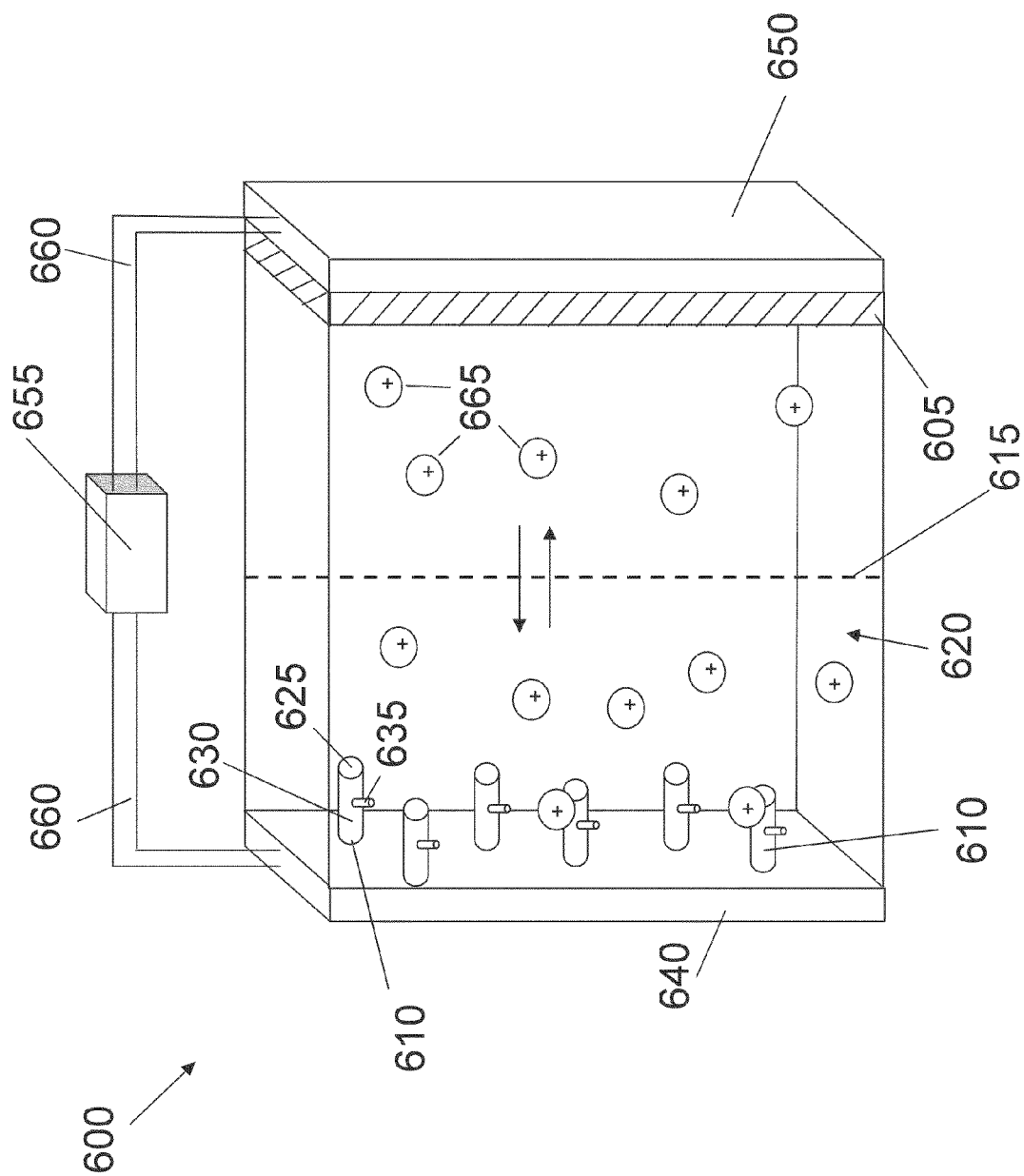
FIG. 7A is a schematic illustration of a battery, according to an illustrative embodiment of the invention.

The compositions described above can be used in a battery, and more particularly, a lithium-ion battery. FIG. 7A shows a battery 600 including a cathode 605, an anode 610, a separator 615, and a non-aqueous electrolyte 620. The separator 615 and the non-aqueous electrolyte 620 are disposed between the cathode 605 and the anode 610. The anode 610 includes an electrically conductive carbonaceous substrate 625 having a surface 630 with at least one crystalline whisker 635 extending from the surface 630. In some embodiments, the electrically conductive carbonaceous substrate 625 can comprise an unordered arrangement of carbon nanofibers. Each of the carbon nanofibers can have a surface and can form an electrically conductive network. At least one crystalline whisker can extend from the surface of each carbon nanofiber.

Referring to FIG. 7A, the battery 600 can also include current collectors 640, 650 and a charger 655. The battery 600 converts chemical energy into electrical energy. When the battery 600 is in use, electrons released in the chemical reaction on the anode 610 side of the battery 600 pass through current collector 640 to the external circuit 660 from the anode 610 to the cathode 605. The separator 615 permits positively charged ions 665 to flow between the anode 610 side of the battery 600 and the cathode 605 side of the battery 600. Therefore, the separator 615 allows the anode 610 and cathode 605 sides of the battery 600 to maintain charge neutrality.

The current collectors 640, 650 can be made of a material that conducts electricity. For example, the current collectors 640, 650 can be made from, for example, aluminum or carbon coated aluminum. The current collectors 640, 650 collect the electrons released in the chemical reaction and guide them to the external circuit 660.

The battery 600 can be rechargeable. For example, the electrode (e.g., anode) can be regenerated after depletion. An external potential is imposed on the electrode, for example, the external potential can be imposed by an external charger 655. The external potential reverses the direction of current flow through the cell. For example, when the cell is being used the current flows from the anode to the cathode, but when the cell is being charged, the current flows from the cathode to the anode.

Figure 7B:
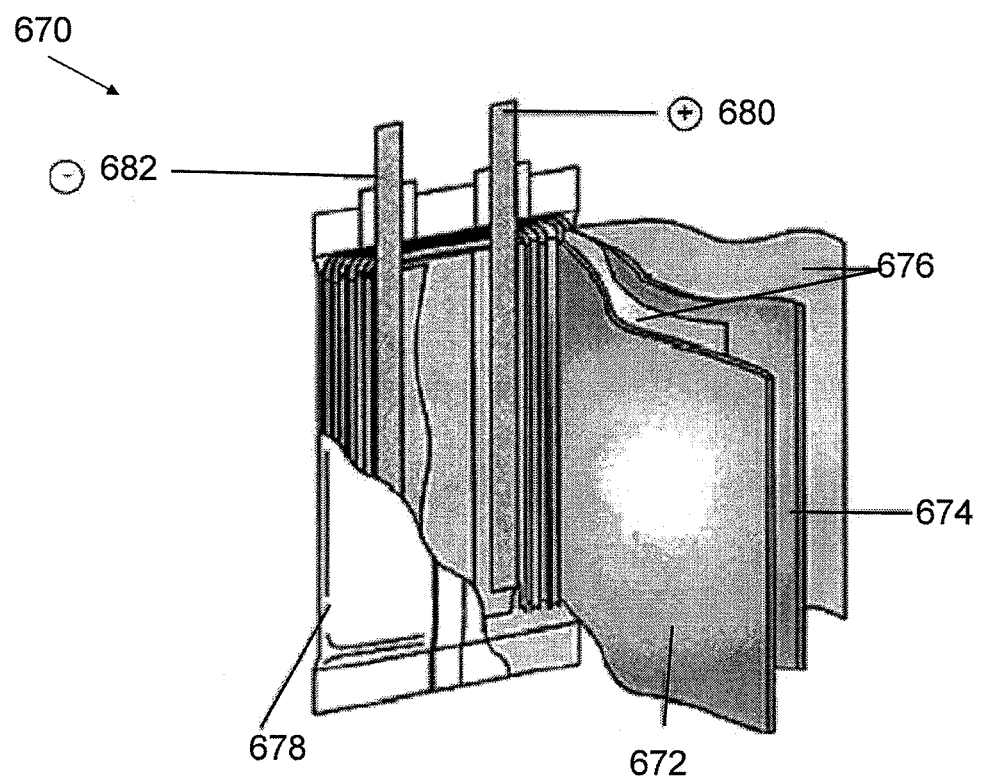
FIG. 7B is a schematic illustration of a lithium-ion battery, according to an illustrative embodiment of the invention.

FIG. 7B shows an illustration of a pouch cell lithium-ion battery 670. The lithium-ion battery 670 can include a plurality of cathodes 672, a plurality of anodes 674, and a plurality of separators 676. A single separator 676 is disposed between each cathode 672 (or positive electrode) and anode 674 (or negative electrode). The battery 670 also includes a case 678, a positive terminal 680, and a negative terminal 682. A non-aqueous electrolyte is also disposed between each cathode 672 and anode 674. The cathode 672 can be formed from metal oxide or a lithium metal.

Electrodes (e.g., an anode) for use within a lithium-ion battery can be fabricated in a variety of ways. As an example, an electrode using carbon nanofibers/silicon whisker composite can be fabricated by mixing 80% by weight carbon nanofiber/silicon whisker composite, 10% acetylene black, and 10% polymer binder. The carbon nanofiber can be, for example, Pryograf III and the binder can be, for example, 6:4 by weight styrene butadiene rubber ("SBR") and sodium carboxymethyl cellulose ("CMC"). De-ionized water can be added to obtain a slurry, which can be cast onto acetone cleaned copper foil. The fabricated electrodes can be dried at room temperature for one hour followed by drying in an 80° C. oven under vacuum for 2 hours.

Carbon nanofiber/silicon whisker composite anodes were tested in half cells. The composite anode, a separator (e.g., Celgard 2500 made by Celgard, LLC), and lithium metal were assembled into a 316 stainless steel fixture that was spring-loaded at 10 lbs. The cells were cycled between about 2 to about 0.05 V at a rate of C/10 to 1 C. The electrolyte used was 1M $LiPF_6$ in 1:1 volume ethylene carbonate/diethyl carbonate with 5% vinylene carbonate. The capacity of the carbon nanofiber was determined by testing the nanofiber based anode in half cells. The charge/discharge capacity of the carbon nanofiber is about 250/500 mAh/g at C/10 for the first cycle.

Figure 8:
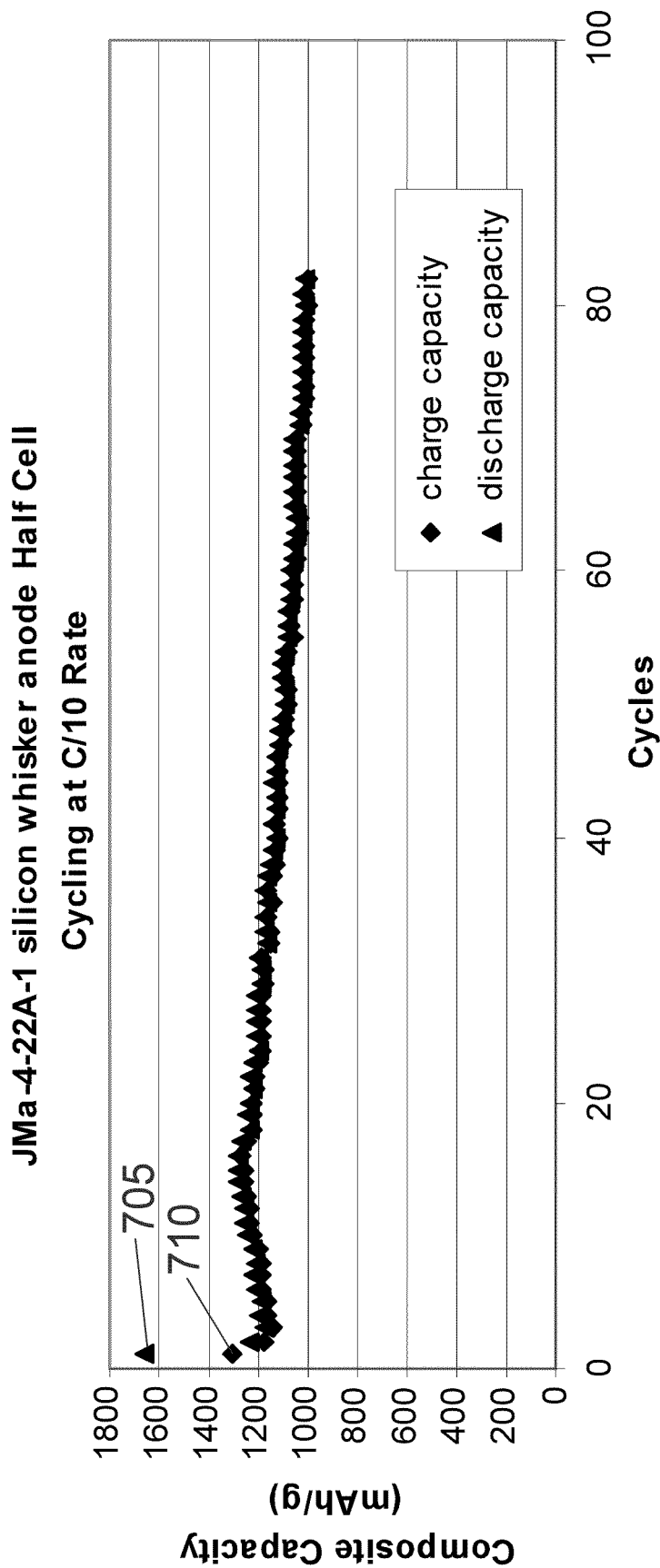
FIG. 8 is a graph of composite capacity versus cycles for a silicon whisker anode half cell, according to an illustrative embodiment of the invention.
Figure 9:
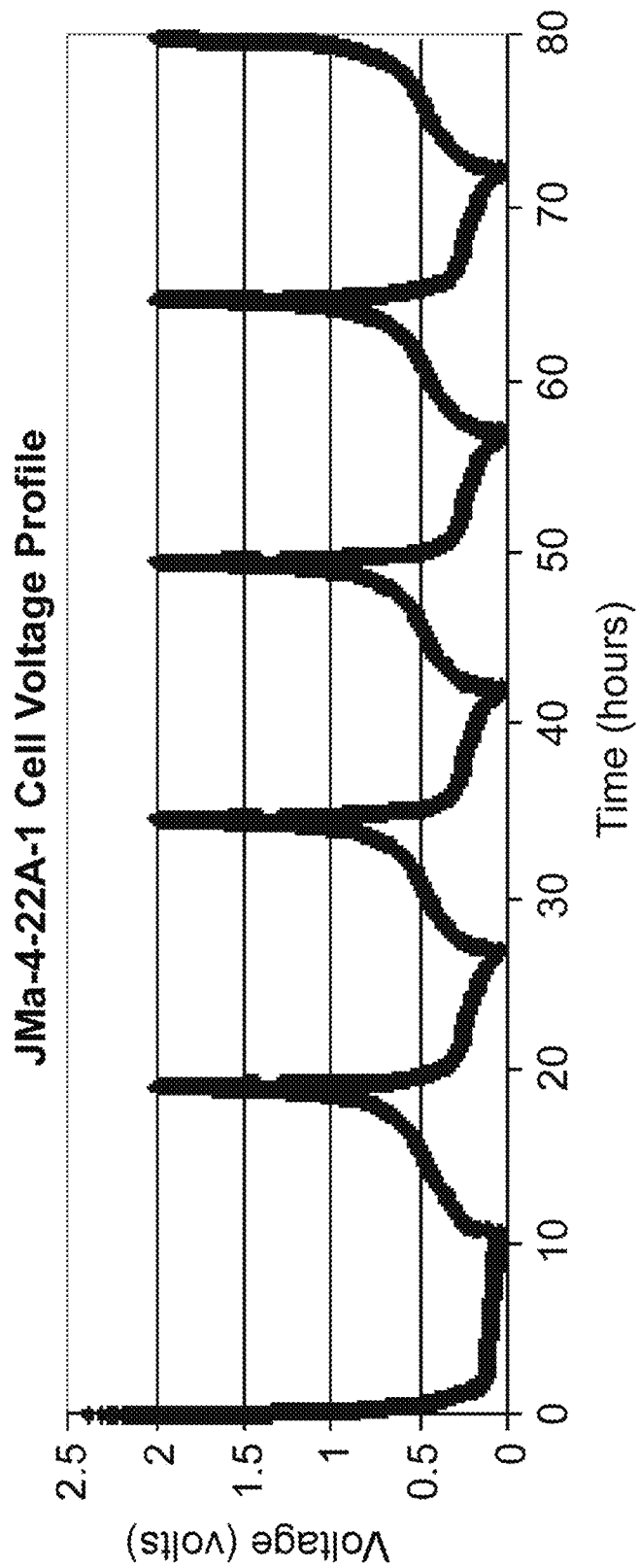
FIG. 9 is a graph of a cell voltage profile showing voltage versus time for the silicon whisker anode half cell of FIG. 7, according to an illustrative embodiment of the invention.
Figure 10:
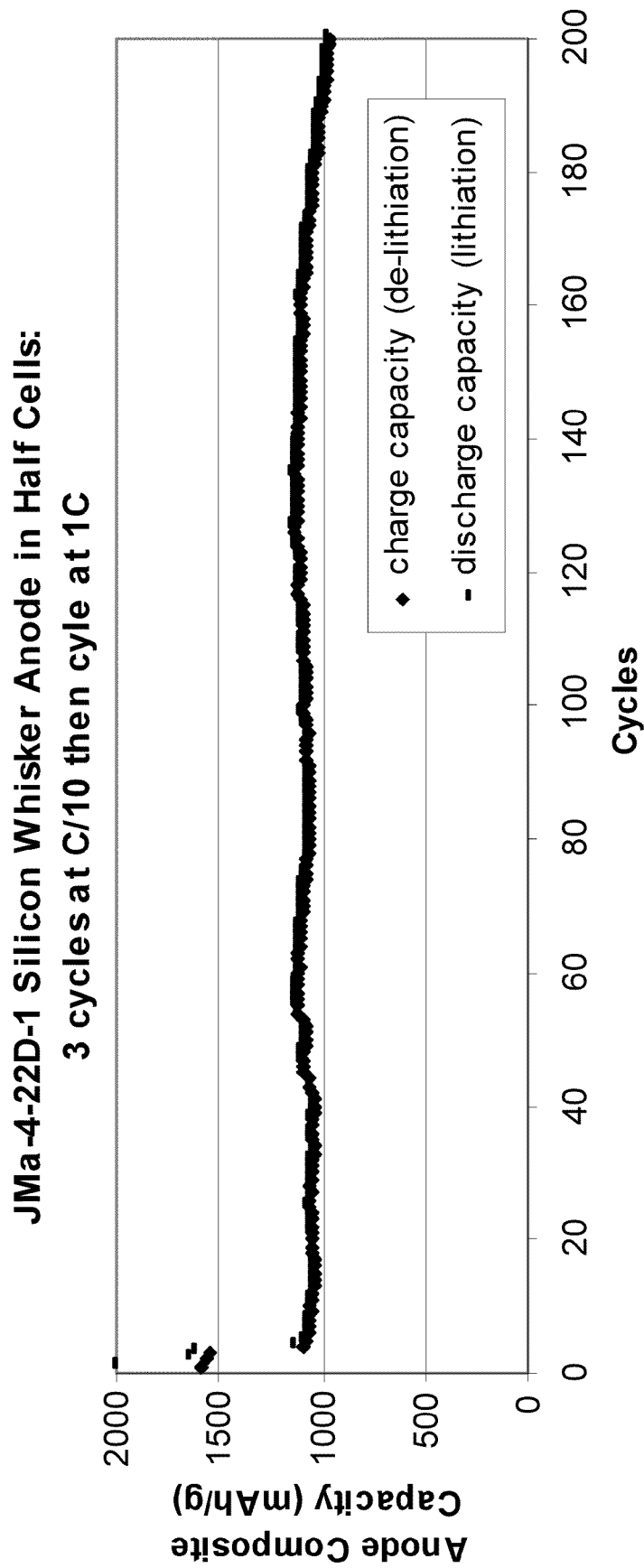
FIG. 10 is a graph of anode composite capacity versus cycles for a silicon whisker anode half cell, according to an illustrative embodiment of the invention.
Figure 11:
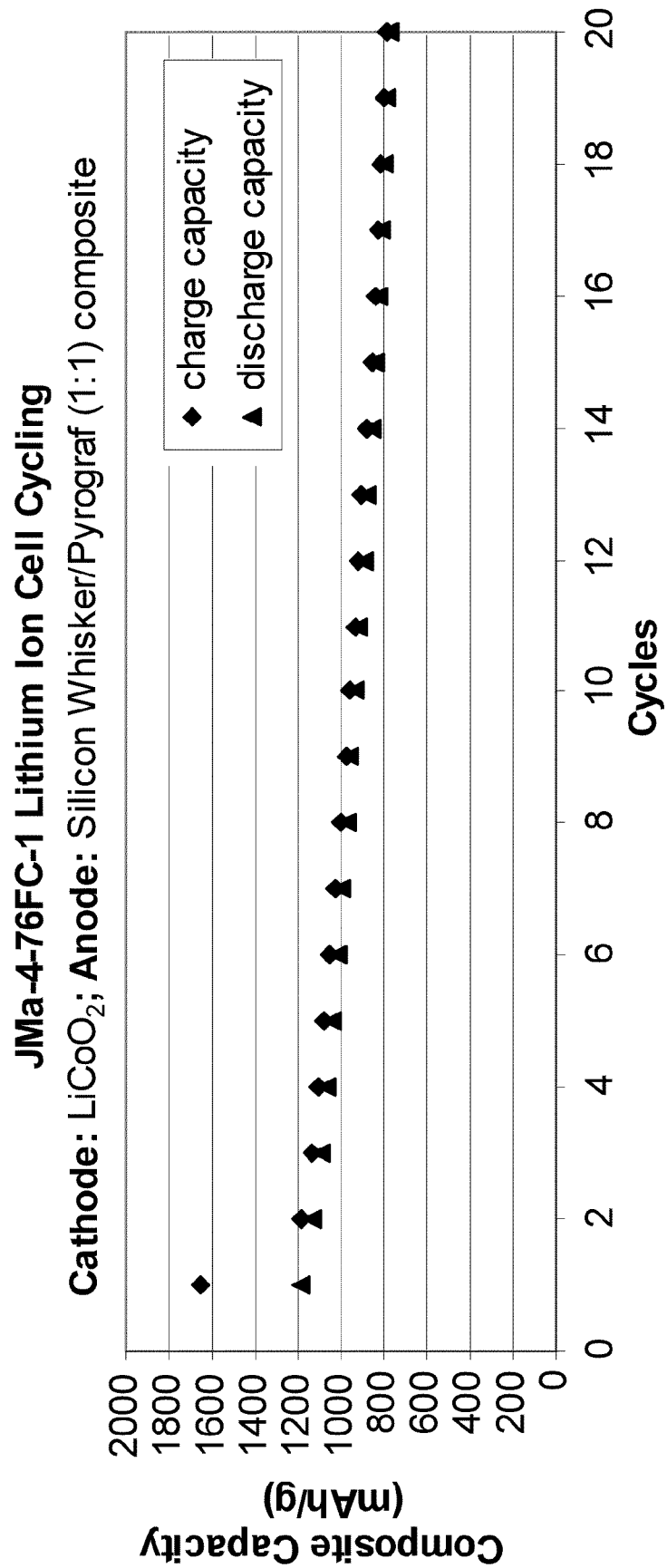
FIG. 11 is a graph of lithium-ion cell cycling of a full cell with $LiCoO_2$ cathode and silicon whisker composite anode, according to an illustrative embodiment of the invention.
Figure 12:
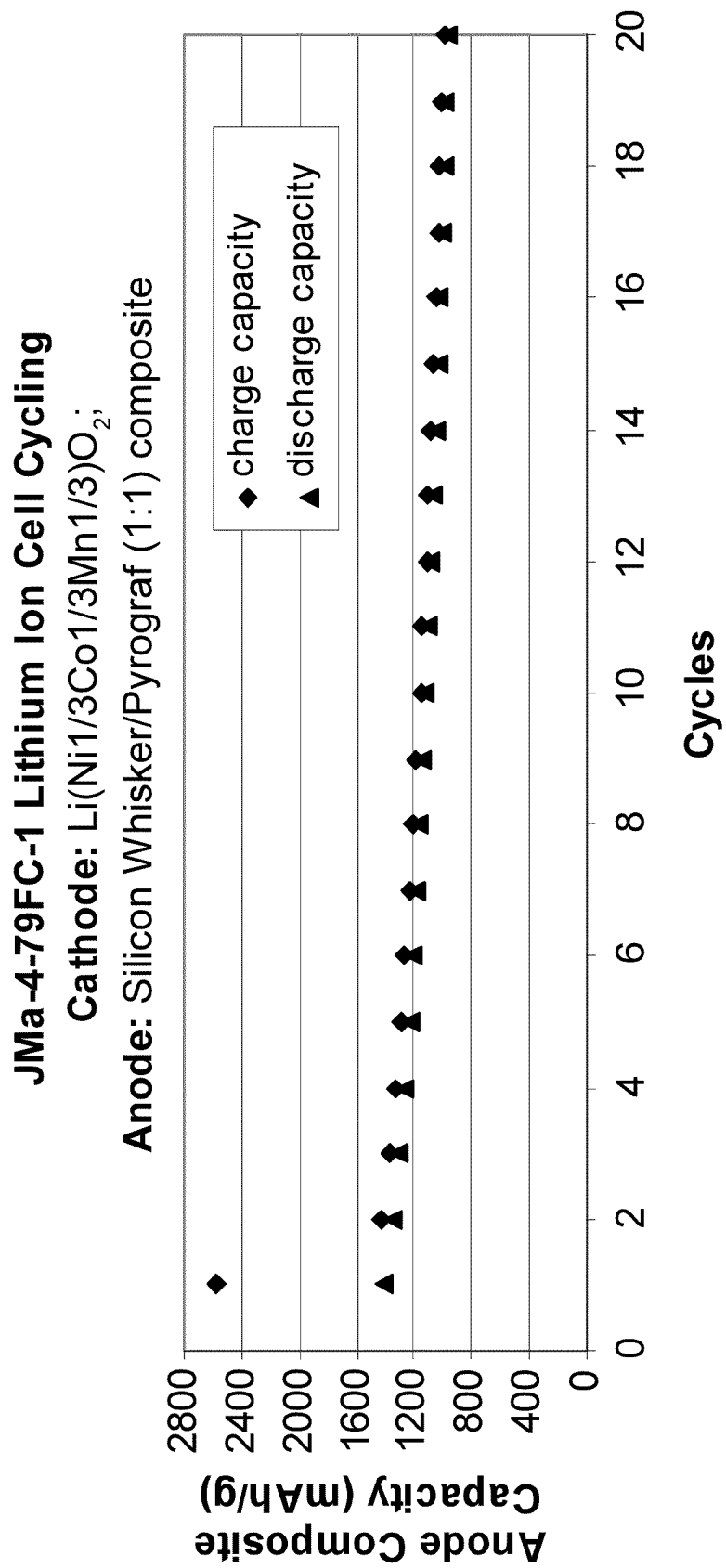
FIG. 12 is a graph of lithium-ion cell cycling of a full cell with $Li_{1+x}(Ni_{1/3}Co_{1/3}Mn_{1/3})O_2$ cathode and silicon whisker composite anode, according to an illustrative embodiment of the invention.

FIGS. 8-10 are graphical representations of various features of the carbon nanofibers/silicon whisker composite anode half cells. FIGS. 11-12 are graphical representations of lithium-ion cell cycling using the carbon nanofibers/silicon whisker composite anode and two different cathodes.

FIG. 8 shows a graph of composite capacity versus cycles for a silicon whisker anode half cell. As shown in FIG. 8, silicon whisker composite anodes of the type described herein exhibit a reversible capacity of greater than 1000 mAh/g. The capacity values were calculated based on the weight of the composite (e.g., 50% silicon whisker and 50% carbon nanofiber) and not based on the weight of the silicon whisker alone. For the first cycle, the discharge capacity 705 is about 1600 to about 1700 mAh/g and the charge capacity 710 is between about 1320 to about 1500 mAh/g.

FIG. 9 shows a graph of a cell voltage profile showing voltage versus time for the silicon whisker anode half cell of FIG. 8. As shown in FIG. 9, the lithiation of Lithium ("Li") ion to silicon takes place at about 0.1 to about 0.2 V and delithiation starts at about 0.2 V. The delithiation (e.g., charge) voltage of this silicon whisker anode is about 200 mV lower than that of conventional graphite anodes (e.g., which plateau at about 0.4 V). The first cycle discharge (lithiation) takes place at about 0.1 V, similar to micron meter size bulk silicon, which indicates that the silicon active in the electrode is highly crystalline.

The silicon whisker anode composition described herein is also capable of high rate cycling when used as an anode in a lithium-ion battery. FIG. 10 shows a graph of anode composite capacity versus cycles for a silicon whisker anode half cell. 200 cycles (beginning with 3 C/10 cycles) of the silicon whisker anode composition as an anode in a lithium-ion battery are shown. The cell showed only about 11% fading in charge capacity at 1 C. The irreversible loss of the first C/10 cycle is about 18% but the reversibility of the first 1 C is less than about 2%. This 1 C cycling result demonstrates that the silicon whisker on carbon nanofiber is capable of moderately high rate as a result of the unique material architecture.

Several cells were tested. The silicon whisker anodes show a high first cycle reversibility of about 80 to about 92%. This first cycle reversibility is more than about 20% higher than that of most conventional silicon nano-composite anodes. High reversibility can be attributed to, for example, electrodes that are high in free volume. It can also be attributed to the single crystalline silicon whisker structure that can survive the volume changes associated with lithium-ion batteries without breaking apart during lithiation and delithiation. Moreover, the carbon nano-fibers can provide an electrically conductive framework for the silicon whiskers that extend from the carbon nano-fiber surface which can result in high reversibility.

Full cells were fabricated and tested using the silicon whisker composite anode described herein with two different cathode materials, $LiCoO_2$ and $Li_{1+x}(Ni_{1/3}Co_{1/3}Mn_{1/3})O_2$. The full cells were all tested between about 4.3 and about 3 V for charge and discharge voltages. The cycling rate was one cycle at C/20 then followed by C/8 cycles. The electrolyte used for these full cells was 1M $LiPF_6$ in EC/DMC/DEC (1:1:1) with 5% by weight vinylene carbonate. This 1:1:1 EC/DMC/DEC electrolyte is capable of working at −30° C.

FIG. 11 shows a graph of lithium-ion cell cycling of a full cell with $LiCoO_2$ cathode and silicon whisker composite anode. FIG. 12 is a graph of lithium-ion cell cycling of a full cell with $L_{1+x}(Ni_{1/3}Co_{1/3}Mn_{1/3})O_2$ cathode and silicon whisker composite anode. As shown in FIGS. 11 and 12, the discharge capacities based on anode composition weight are about 1200 to about 1300 mAh/g at a C/10 rate. Without any formation cycles for both full cells, the first cycle irreversible loss is about 28% and 45% for the $LiCoO_2$ cell and the $Li_{1+x}(Ni_{1/3}Co_{1/3}Mn_{1/3})O_2$ cell, respectively. The irreversible loss can be improved by optimizing the cathode formulation and/or calendaring. Half cells were also tested and the first cycle irreversible loss for $Li_{1+x}(Ni_{1/3}Co_{1/3}Mn_{1/3})O_2$ cathode is about 16% and for the $LiCoO_2$ cathode is about 26%.

A process for manufacturing a battery can include providing a cathode current collector that defines a surface. The cathode current collector can be any electrically conductive material, for example, aluminum or carbon coated aluminum. A cathode material can be deposited onto the surface of the cathode current collector. The cathode material can be, for example, $LiCoO_2$. An electrode using $LiCoO_2$ can be fabricated by mixing 90% by weight $LiCoO_2$, 5% acetylene black, and 4% polymer binder. In some embodiments, the cathode material is $LiCoO_2$ and the binder material is Poly(vinylidene fluoride). N-Methyl-2-pyrrolidone can be added to obtain a slurry, which can be cast onto acetone cleaned aluminum foil. The fabricated electrodes can be dried in an 80° C. oven under vacuum for 2 hours.

An anode current collector can be provided including an electrically conductive carbonaceous substrate having a surface. An anode composition is formed on the surface of the electrically conductive carbonaceous substrate. The anode composition can be formed by a, for example, CVD or VLS process. The anode composition includes at least one crystalline whisker extending from the surface of the electrically conductive carbonaceous substrate.

Catalyst seeds can be deposited on the electrically conductive carbonaceous substrate. The crystalline whisker(s) can be formed at a location on the surface of the electrically conductive carbonaceous substrate where one of the plurality of catalyst seeds are deposited. The catalyst seeds can comprise, for example, gold, aluminum, or a silicon eutectic forming material.

Figures 13A, 13B:
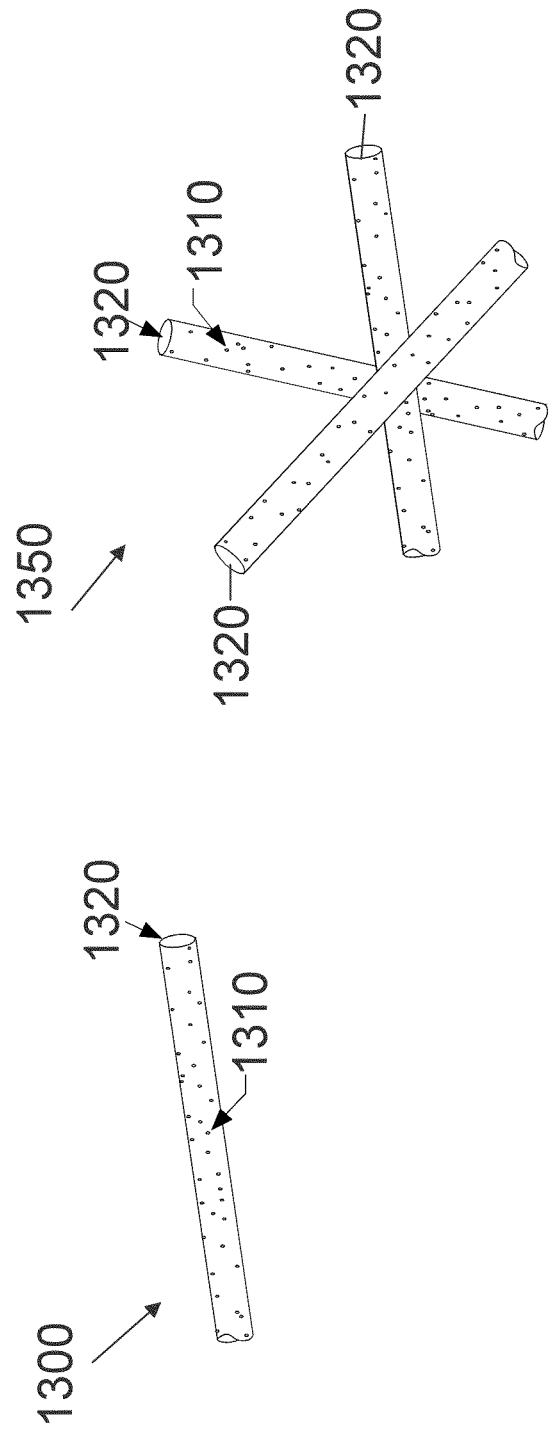
FIG. 13A is a schematic illustration of a catalyst seeded nanofiber, according to an illustrative embodiment of the invention.
FIG. 13B is a schematic illustration of catalyst seeded nanofiber in a network form, according to an illustrative embodiment of the invention.

In some embodiments, a gold-catalyzed VLS process is used to form the anode composition on the electrically conductive carbonaceous substrate. Gold catalyst seeds can be loaded on the electrically conductive carbonaceous substrate. FIG. 13A shows a schematic illustration of a catalyst seeded nanofiber 1300. FIG. 13B shows a schematic illustration of catalyst seeded nanofiber in a network form 1350. As shown in FIGS. 13A and 13B, a plurality of gold catalyst seeds 1310 can be loaded onto the electrically conductive carbonaceous substrate 1320.

The introduction of gold catalyst seeds onto the electrically conductive carbonaceous substrate can be carried out in two steps. First, the electrically conductive carbonaceous substrate can be functionalized by soaking the substrate in a solution. Then, the electrically conductive carbonaceous substrate can be soaked in a gold colloid solution. For example, gold catalyst seeds can be loaded onto a Pyrograf III nanofiber. One gram of Pyrograf III nanofiber can be functionalized by soaking the nanofiber in about 0.1% w/v aqueous poly-L-lysine solution, for example a solution sold by Ted Pella, Inc. The nanofiber can be soaked for approximately 5 minutes and then dried at about 80° C. for about 10 minutes. Next, the nanofiber can be soaked in 20 nm diameter gold colloid solution, for example, a solution sold by Ted Pella, Inc. The nanofiber can be soaked for about 5 minutes and then dried in an 80° C. oven for approximately 2 hours.

Figure 14:
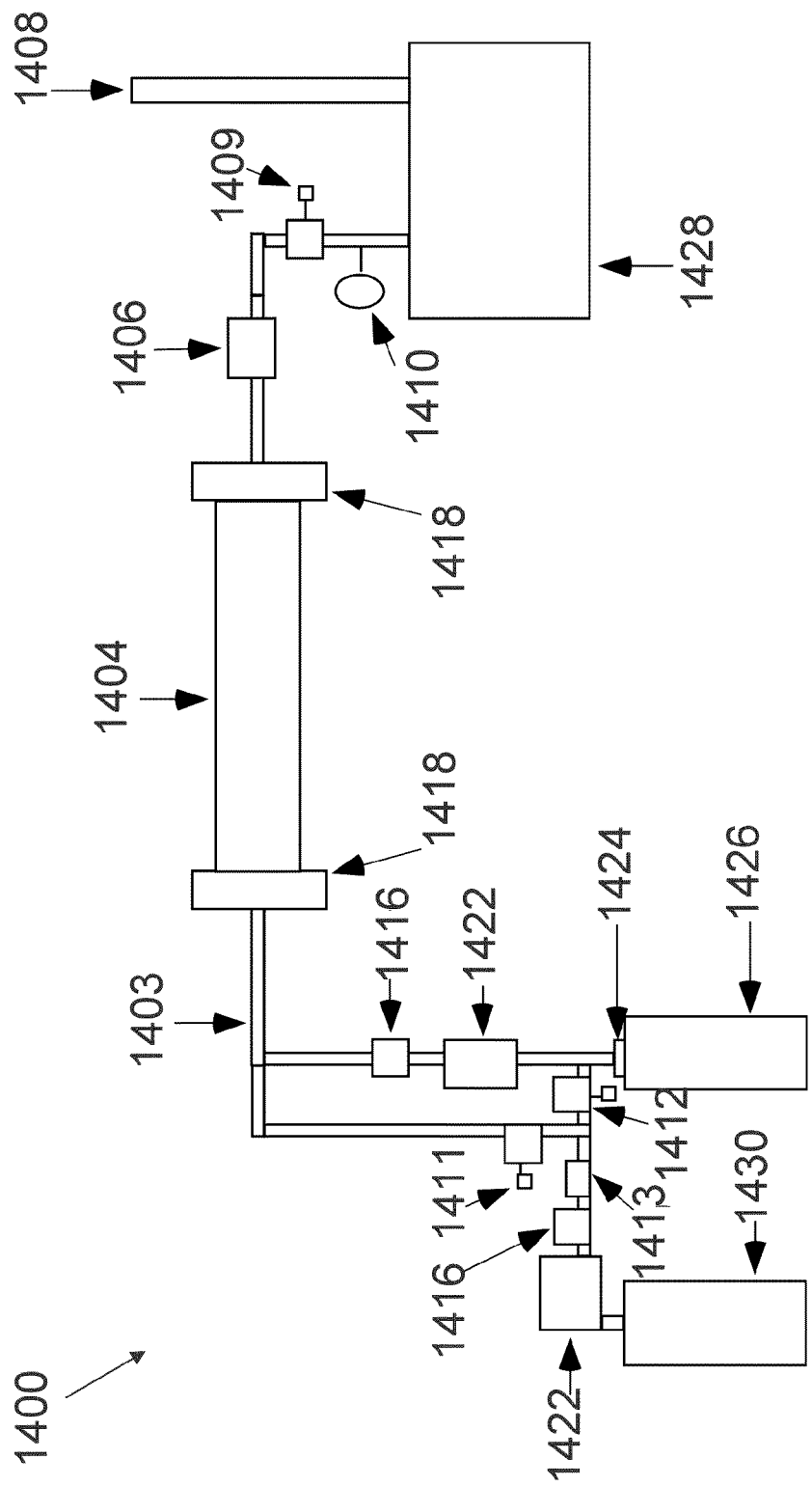
FIG. 14 is a schematic illustration of a VLS system, according to an illustrative embodiment of the invention.

FIG. 14 is a schematic illustration of a VLS system 1400. The VLS system 1400 includes stainless steel flex tubing 1403 for sample inlet and sample extraction, a quartz tube 1404, a particulate filter 1406, an exhaust 1408, five valves 1409, 1410, 1411, 1412, 1413, mass flow meters 1416, stainless steel sealing flanges 1418, regulators 1422, a flow restricting orifice 1424, an $SiH_4$ supply 1426, a mechanical vacuum pump 1428, and an argon gas supply 1430.

The VLS reaction has several steps. Before the reaction occurs, the catalyst loaded electrically conductive carbonaceous substrate is loaded into the reactor, or the quartz tube 1404. The reactor 1404 is pumped down, using mechanical vacuum pump 1428, to less than about 1 millitorr for approximately 14 hours. Argon is flowed from the argon gas supply 1430 into the reactor 1404 by adjusting the regulator 1422 and or valves 1411, 1413. The reactor 1404 is leak checked. For example, a leak rate of less than about 5 millitorr per minute can be achieved. The entire system 1400 is then flushed with argon gas from the argon gas supply 1430 by adjusting the regulator 1422 and or valves 1411, 1413. The system 1400 can be flushed with argon gas for about 30 minutes. The argon gas and vacuum within the reactor 1404 keeps the reactor 1404 relatively free of air (e.g., oxygen) during silicon whisker synthesis since oxygen can oxidize the silicon whisker to silica at reaction temperature.

After the system 1400 is prepared for the reaction, the quartz tube 1404 can be heated. For example, the quartz tube 1404 can be heated to about 500° C. A silane mixture gas from the $SiH_4$ supply 1426 (for example $SiH_4$, 2% in Argon) can be flowed to the quartz tube 1404 through the flow restricting orifice 1424 at a rate of about 60 to about 80 sccm by adjusting valve 1412 and/or regulator 1422. During this time, the pressure within the quartz tube can be kept at about 30 Torr. The reaction can take about 60 minutes to complete. In some embodiments shorter or longer times are used. If longer whiskers are desired, then the reaction can proceed for longer periods of time, for example, for about 120 minutes or longer. If shorter whiskers are desired, then the reaction time can be short, for example, for about 30 minutes or shorter.

After the reaction is complete, the gas is switched from the silane mixture gas to argon gas by adjusting the valves 1411, 1412, 1413 and/or regulators 1422. The system 1400 is flushed with argon gas while the system 1400 cools to about room temperature. This flushing cleans the reactor 1404 and removes the silane gas mixture from the system 1400.

One skilled in the art will realize the invention may be embodied in other specific forms without departing from the spirit or essential characteristics thereof. The foregoing embodiments are, therefore, to be considered in all respects illustrative rather than limiting of the invention described herein. Scope of the invention is thus indicated by the appended claims, rather than by the foregoing description, and all changes that come within the meaning and range of equivalency of the claims are, therefore, intended to be embraced therein.

What is claimed is:

1. A method of manufacturing a battery, comprising:
depositing a cathode material onto a surface of a cathode current collector;
forming an anode composition on a second surface of an electrically conductive carbonaceous substrate, the anode composition including at least one crystalline whisker extending from and grown directly on the second surface of the electrically conductive carbonaceous substrate, the one crystalline whisker is an electro-active material; and
depositing the anode composition on the second surface of the electrically conductive carbonaceous substrate onto an anode current collector.

2. The method of claim 1 further comprising:
depositing catalyst seeds on the electrically conductive carbonaceous substrate; and
forming the at least one crystalline whisker at a location on the second surface of the electrically conductive carbonaceous substrate where one of the plurality of catalyst seeds are deposited.

3. The method of claim 2 wherein the catalyst seeds comprise gold, aluminum, or a silicon eutectic forming material.

4. The method of claim 2 wherein the catalyst seeds have a diameter of less than about 100 nanometers.

5. The method of claim 1 wherein the at least one crystalline whisker comprises silicon.

6. The method of claim 1 further comprising using a gold-catalyzed vapor-liquid-solid process to form the anode composition on the electrically conductive carbonaceous substrate.

7. The method of claim 1 wherein the at least one crystalline whisker is formed from a material selected from the group consisting of silicon, germanium, and tin.

* * * * *